April 4, 1944.  R. GOLDNER  2,346,024

SLIDING CLASP FASTENER

Filed Jan. 1, 1943  3 Sheets-Sheet 1

Inventor:
Richard Goldner
by
Singer, Ehlert, Stout & Carlberg
Attorneys

April 4, 1944. R. GOLDNER 2,346,024
SLIDING CLASP FASTENER
Filed Jan. 1, 1943 3 Sheets-Sheet 3

Inventor:
Richard Goldner
by Singer Ehlert Stout + Carlby
Attorney

UNITED STATES PATENT OFFICE 2,346,024

SLIDING CLASP FASTENER

Richard Goldner, Sydney, New South Wales, Australia

Application January 1, 1943, Serial No. 470,954
In Australia November 12, 1941

18 Claims. (Cl. 24—205)

This invention relates to clasp fasteners of the kind comprising two elongated fastener members and a runner or slider, each member consisting of helically wound wire-coil, with the coils of the two fastener members having equal pitch but opposite sense of winding.

Experience has proved that fasteners of this kind, the members of which consist each of one smooth helically wound wire-coil, are not satisfactory in use, and are not applicable to many purposes, as they generally burst or open when bent in certain directions.

Several modifications to coil-fasteners of this kind have therefore been proposed, such modifications comprising, inter alia, the lasting deformation of the coils, or of one coil at least, at regular intervals or the formation therein of a series of recesses (notches) and/or projections, so as to form a series of anchoring elements adapted to provide positive connection between the coiled members. It will be understood that the formation in the coils of lasting deformations or of recesses and/or projections not only complicates the manufacture of the fastener, and very considerably increases its cost, but also fails to render it perfectly safe and satisfactory since, in the event of distortion or unintentional deformation in use, some of the preformed deformations or the like may become ineffective, or eliminated, which would again result in the undesired liability of the fastener to burst locally, or in other inconveniences.

It is the object of the present invention to provide an improved slide fastener of the coil type which is extremely simple in its construction and inexpensive, and in which nevertheless such bursting, either incidentally or due to wrong or rough use, is positively avoided.

In accordance with the present invention this object is achieved by making the two coiled fastener members, or one of the two members at least, of more than one, preferably of two, wire coils which have their corresponding windings juxtaposed to form groups (such members being hereinafter called "composite members"), the arrangement being such that the fastener member designed to grip such composite member has its "effective interspaces" normally narrower than the "combined thickness" of the juxtaposed windings constituting one "operative convolution" of such composite member, irrespective of whether the member designed to grip the composite member consists of a single coil, or is itself also a composite member.

What in the above definition is meant by "effective interspaces" and "operative convolutions" will be understood from the following specification and the drawings.

Figures 12, 13:
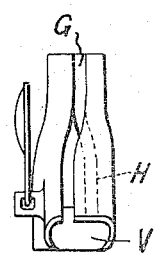
Fig. 12 is a front elevation of a slide or runner for a fastener of the type illustrated in preceding figures.
Fig. 13 is a side elevation.
Figure 14:
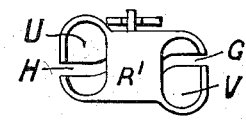

Fig. 14 a bottom plan view of the slide or runner shown in Fig. 12.

Figure 1:
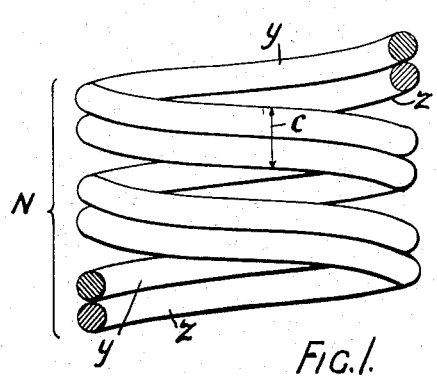
Fig. 1 is a fragmentary elevation of a composite member forming part of the assembly of the fastener.
Figure 2:
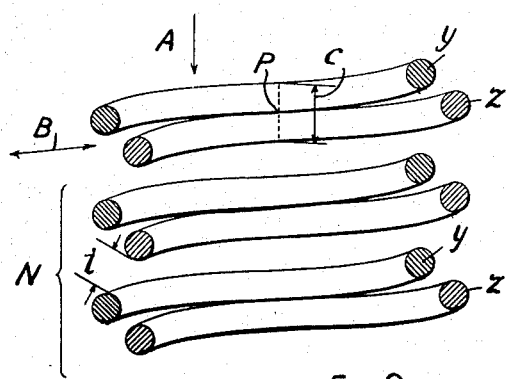
Fig. 2 is an axial sectional view of a similar composite member.

Figs. 1 and 2 illustrate one composite member N constituted by two wire coils $y$ and $z$, Fig. 1 showing the coils with the juxtaposed windings in contiguous relation, Fig. 2 in "quasi-contiguous" relation. With the windings $y$ and $z$ in contiguous relation (Fig. 1) the coils contact along a continuous helical line. With the windings in quasi-contiguous relation contact between the windings $y$ and $z$ occurs at diametrically opposite points P in each convolution of the member N as will more clearly be seen from Fig. 3 which illustrates two juxtaposed windings $y$, $z$ only of the member N seen in the direction of arrow A of Fig. 2. The change of the relative position of the coils $y$ and $z$ from the one shown in Fig. 1 to that shown in Fig. 2 can be brought about by a relative displacement of the coils $y$ and $z$ in a substantially transverse direction, as represented in Fig. 2 by a double-pointed arrow B.

Figure 3:
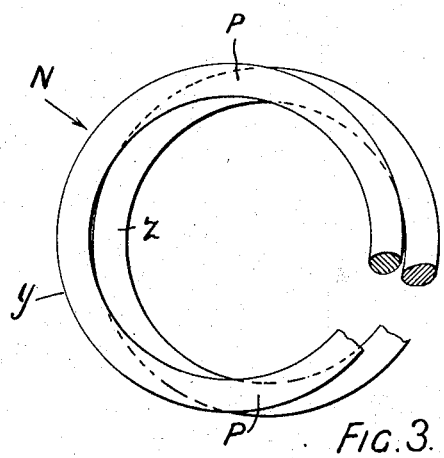
Fig. 3 is a fragmentary top plan view of the composite member shown in Fig. 2.

With reference to Figs. 1 to 3 it is stated that two juxtaposed coil windings $y$ and $z$ of the composite member N constitute a single "operative convolution" thereof, the "combined thickness" of which is represented by $c$ (which is the thickness of the two windings $y$ and $z$ at their points of seeming intersection P—Fig. 3—and is also the thickness, throughout the circumference of the coils, of the windings in contiguous relation—(Fig. 1), whereas the "effective interspaces" between successive operative convolutions of the member N is indicated by $i$.

Thus with reference to the said figures the above definition of the invention may also be expressed as follows:

The operative interspace $i$ between successive convolutions of one fastener member (irrespective of whether said member consists of a single coil or is itself a composite member) is narrower than the combined thickness $c$ of the juxtaposed windings constituting one effective convolution of the composite member which it is to engage.

Anticipatory to the following description it is stated, that, with the fastener members according to the invention in operative interengagement a relative displacement in a substantially transverse direction of the coils of composite members must take place, whereas in disengaged condition the coils of composite members, or any disengaged sections thereof, are free to assume throughout, or locally, any of the relative positions shown in Figs. 1 and 2. The relative transverse dislocation, in the closed fastener, of the coils constituting a composite member varies not only with the ratio of the wire gauge to the coil pitch, but also in response to the acting forces (elastic forces, if any, lateral pull, etc.). Therefore, the amount of such dislocation cannot be accurately predetermined.

Figure 4:
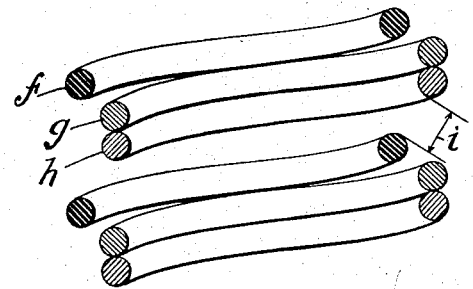
Fig. 4 is a fragmentary axial section of another fastener member.

With composite members embodying three or more coils (see for instance explanatory Fig. 4) the combined thickness of the windings $f$, $g$, $h$ constituting one operative convolution cannot be unambiguously defined though it may be stated that it is not less than, and may even be in excess of, the double thickness of the coil-wire. As may also be seen from Fig. 4, the width of the operative interspace $i$ can be defined as the minimum distance between the nearest wires of adjacent operative convolutions.

Fasteners embodying a composite member or members having three or more coiled elements are feasible and yield the desired locking effect. However, since the effect aimed at is completely and in the simplest manner achieved with a composite member, or members, embodying two wire coils only, double-coil members are exclusively considered in the following description of the fastener according to the present invention.

Figure 5:
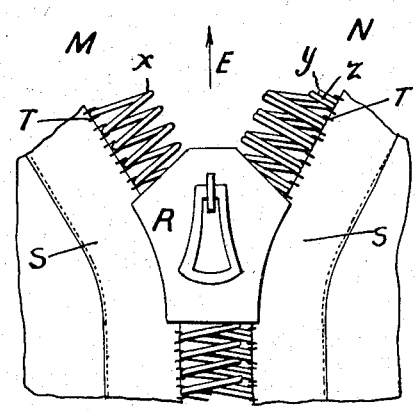
Fig. 5 shows in front elevation a fastener of this improved type in association with portions of a garment to be united thereby.
Figure 6:
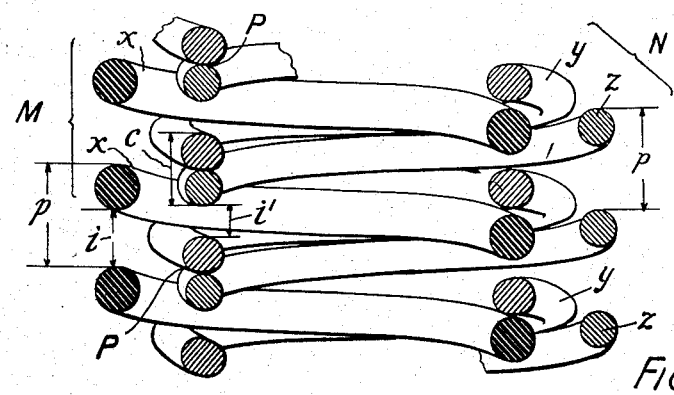
Fig. 6 is a fragmentary sectional view through a fastener of the type illustrated in Fig. 5, this section being taken on line 6—6 of Fig. 7.
Figure 7:
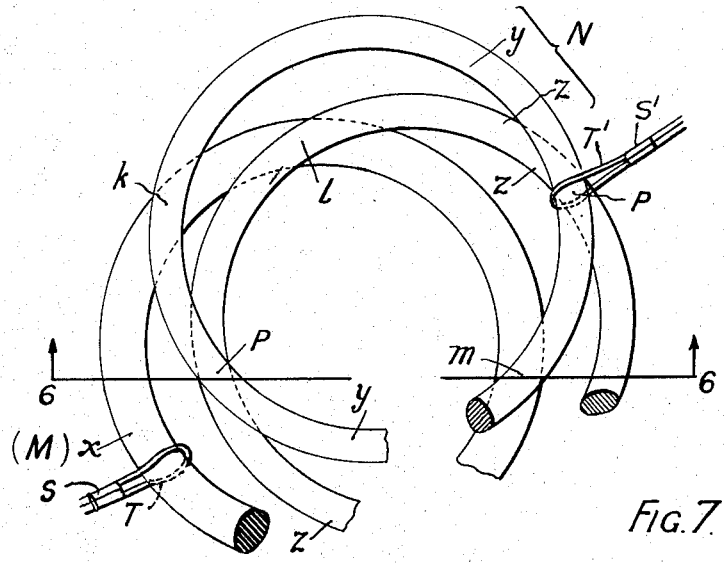
Fig. 7 is a fragmentary top plan view of the fastener members pertaining to the fastener illustrated in Fig. 5.

In the embodiment of the fastener as shown in Figs. 5 to 7, one fastener member M is constituted by a left-hand wound wire coil $x$ and the other member N by one pair of right-hand wound wire—coils $y$ and $z$, the coils of both members M and N having equal pitch $p$ (Fig. 6). For use each fastener member is affixed in any convenient manner, to a suitable material, e. g. to a stringer tape S. For instance, the fastening to the tape may be effected by a thread T as shown. Also the fastener is fitted with a runner or slider R of any suitable construction and design which, in known manner, is adapted to effect both the separation and the joining of the fastener members M and N.

In accordance with the invention, the coils from which the members M and N are made, are so formed that the interspace $i$ (Fig. 6) left between two successive convolutions of the coil $x$ (member M) is normally smaller than the "combined thickness" $c$ of the juxtaposed windings $y$ and $z$ of the member N in either contiguous or quasi-contiguous relation. This obviously implies that at the contact points P, the interspace $i^1$ left between successive convolutions of the composite member N, is also smaller than the thickness of the wire $x$ forming the member M. This applies to both the gripping condition (Fig. 6) and the disengaged condition, in which latter condition—as stated above—the coils $y$ and $z$ are free to assume either transversely dislocated relative positions (Fig. 2), or may be in axial alignment (Fig. 1).

In the gripping condition, however, i. e. where the members M and N are interengaged, the windings $y$ and $z$ of the composite member N must necessarily be displaced in a substantially transverse direction to assume the required quasi-continguous relation shown in Figs. 2, 3, 6 and 7, consequent to the tendency of the member M to retain its form (pitch $p$ and interspaces $i$) or, more correctly, due to the fact that the resistance of the composite member N to having its elements $y$ and $z$ relatively displaced in a transverse direction is less than the force required for expanding the member M, irrespective of whether or not the latter member be made of resilient (springy) material.

Disengagement of the member N from the member M, i. e. opening of the closed fastener, cannot be effected by merely exerting a lateral pull on the members, i. e. by pull exerted in a direction substantially transverse to the axes of the coils in interengagement. This will more readily be understood with reference to Figs. 6 and 7 of the drawings which show that in the closed condition of the fastener one of the two points P of contact or apparent intersection of the transversely dislocated windings $y$ and $z$ of the member N, is within the compass of the member M. As stated above the thickness of the system constituted by the windings $y$ and $z$ at the points P is the combined thickness $c$, whereas the thickness of the system $y$, $z$, at any point $k$, $l$, $m$, ... of seeming intersection of the coils $y$ and $z$, respectively, with the member M equals to signal wire thickness, and is less than the width $i$ of the effective interspace left between successive convolutions of the member M which, as also stated above, is less than the combined thickness $c$. Owing to the thickness of the system $y$, $z$, at the contact point P the said windings $y$, $z$, once inserted between successive convolutions of the member M, cannot be withdrawn therefrom unless the effective interspaces $i$ between successive convolutions of M are correspondingly widened. Likewise the member M cannot be withdrawn from between successive operative convolutions of the member N unless the interspaces $i^1$ are widened in the vicinity of the points P where the coils $y$, $z$ contact. Any tendency, consequent to lateral pull on the closed fastener, to effect local expansion of the members in a considered elemental portion thereof (as would be required for obtaining local disengagement in said elemental portion) will be counteracted by the tendency of the portions adjoining at either side of the considered elemental portion, which adjoining portions would also need expansion to allow for disengagement but will, on the contrary, be compressed and their interspaces reduced, if expansion of the considered elemental portion occurred.

It will be understood that in the position shown in Figs. 6 and 7 the members M and N in engagement allow for slight relative dislocations (both translatory and rotary) in transverse direction. Consequently the fastener is extremely pliable in use. Positive interlocking of the members only occurs while the fastener is subjected to lateral pull.

Even under heavy lateral pull no separation of the fastener members can be effected, bursting without pull being entirely excluded. The locking effect is maintained if and when the fastener is bent in any plane or direction, or directions, as long as the above defined relation between the effective interspaces of the members and combined thickness of the composite convolutions subsists. Favourable conditions also subsist with small radii of deflection.

Under torsional strain the locking effect of the closed fastener member is intensified.

It is a considerable advantage of the fastener according to the invention that the pitch $p$ of its coiled elements $x$, $y$, and $z$ is not, or is not perperceptibly, altered when the members are brought into engagement, the locking effect being due exclusively to the transverse dislocation of the coils $y$, $z$ of the composite member N. Elastic contraction of the coils which is essential to the functioning of some known forms of coiled fasteners is not essential to the functioning of the fastener as hereinbefore described.

Closing of the fastener according to the invention is effected by the abovementioned runner or slider R, by means of which the separated members M and N are locally bent and unilaterally expanded so as to allow for the convolutions of the member M to enter, in succession, the opposite expanded interspaces $i$ of the member N and, at the same time, the convolutions of the composite member N to enter the expanded interspaces $i^1$ of the member M, while the runner R is moved in the direction of the arrow E (Fig. 5). Disengagement of the members M and N is effected by movement of the runner R in the opposite direction.

Figure 8:
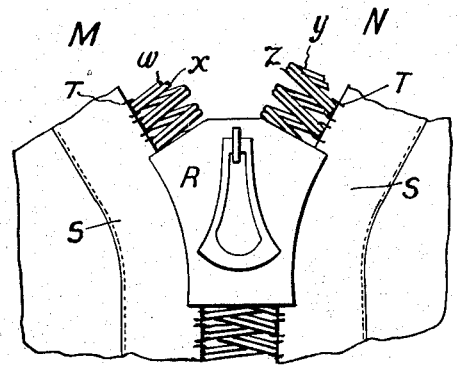
Fig. 8 is the front elevation similar to Fig. 5 of fastener members applied to portions of garments to be united thereby.
Figure 9:
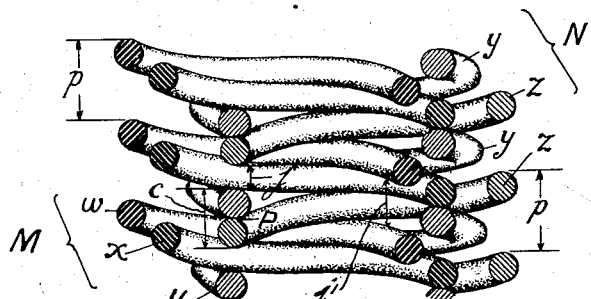
Fig. 9 is a fragmentary axial sectional view through fastener members for the fastener shown in Fig. 8 in operative relation, this view being taken on line 9—9 of Fig. 10.
Figure 10:
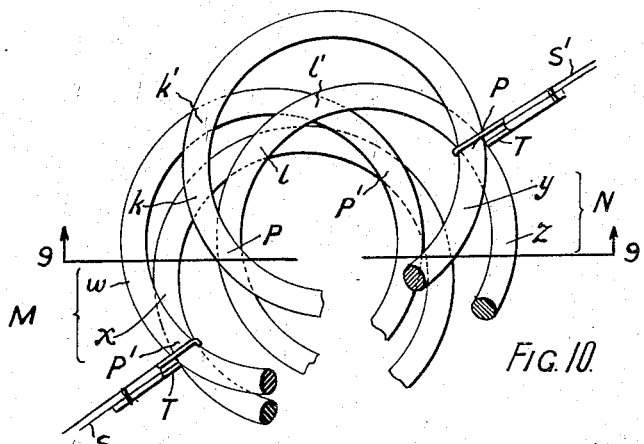
Fig. 10 is a fragmentary top plan view of the fastener elements illustrated in Fig. 9.

In a further embodiment shown in Figs. 8, 9 and 10 of the drawings each of the members M, N, is of the composite type, member M comprising two left-hand wound coils and member N two right-hand wound coils, all coils having the same pitch $p$. Juxtaposed windings $w$, $x$ of the member M, and juxtaposed windings $y$, $z$ of the member N are held in contiguous or quasi-contiguous relation, and secured to suitable material, for instance stringer tape S, by loops or stitches of threads T and $T^1$, respectively. Thus with the fastener closed, each pair of windings $w$, $x$ of the member M enters the interspaces between successive pairs of windings $y$, $z$ of the other member N, and vice versa.

Figs. 9 and 10 of the drawings show that in the closed fastener one of the two points P of contact of the transversely displaced windings $w$ and $x$ of the member M is within the compass of the member N, and also one of the contact points $P^1$ of the member N within the compass of the member M. Again the thickness of the systems at the points P and $P^1$, respectively, is the combined thickness $c$, whereas the thickness at any point $k$, $k^1$, $l$, $l^1$, $m$ ... of seeming intersection of the coils of different systems equals to single wire thickness only and is therefore less than the width $j$ or $j^1$ of the effective interspace left between successive convolutions of the member M and N respectively.

The locking effect is again secured by the dimensioning of the coils of the members in such a manner than the effective interspaces $j$, $j^1$ left between the successive operative convolutions of each member are smaller than the combined thickness $c$ of the operative convolutions of the other member.

The operation and function are the same as with the first described example and need not be particularly described. The effect obtained is also the same, in principle, but it is more pronounced and the interlocking more complete owing to the use of two composite members instead of one.

Figure 11:
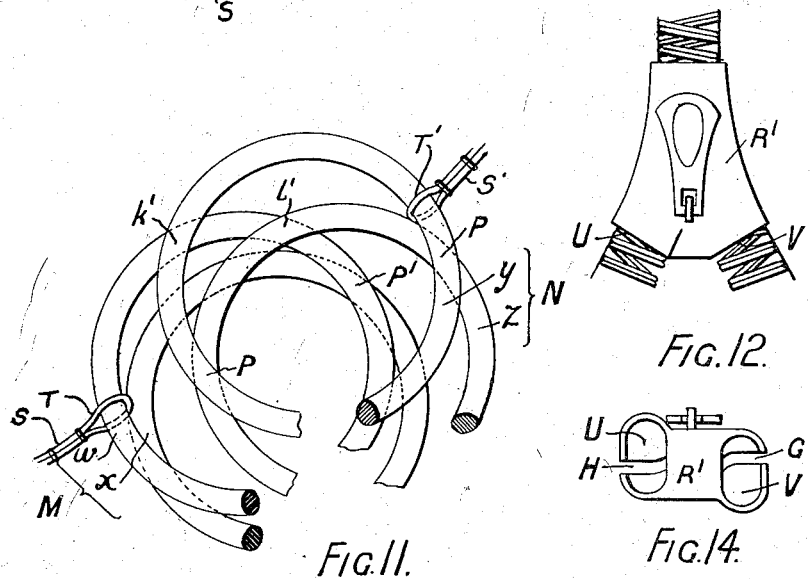
Fig. 11 is a similarly top plan view through a modified fastener assembly similar to that of Figs. 9 and 10.

The further embodiment of the fastener shown in Fig. 11 differs from that according to Figs. 9 and 10 only in that the coil $w$ of the member M and the coil $y$ of the member N only are secured by threads T, $T^1$ or the like to the respective material or portions of material (for instance stringer tapes S), whereas coils $x$ and $z$ are not secured and thus are free in any disengaged sections of the members to assume, within limits determined by the coil-shape of the elements concerned, any desired positions relative to the coils $w$ and $y$, respectively. With the effective interspaces $j$ between sucessive operative convolutions of each member (for instance M) smaller than the combined thickness $c$ of the other member (for instance N), the same effect is obtained as with the members according to Figs. 8 to 10. However, in fasteners according to Fig. 11 appropriate precautions must be taken in the assembling of the members M and N from the coils, to assure that in the closed condition of the fastener (1) pairs of juxtaposed windings of each member should enter the interspaces between pairs of juxtaposed coil windings of the other member and (2) that in operative engagement of the members M, N the sequence of coils should be . . . —$w$, $x$—$y$, $z$—$w$, $x$—$y$, $z$— . . . but not . . . —$x$, $w$—$y$, $z$—$x$, $w$—$y$, $z$— . . . , which means that, in the closed fastener, the windings of each non-secured (floating) coil $x$ and $z$ shall engage the adjoining windings of the two "secured" coils, but not the windings of the other floating coil ($z$ or $x$, respectively).

Fulfilment of the above conditions can be secured in various ways. For instance, it can be secured by the proper joining in any feasible manner (for instance by sewing, tying, soldering) of one pair only, or of a few pairs, of windings of the member M on the one hand, and of one pair, or of a few pairs, of windings of the member N on the other hand (e. g. the end windings of the fastener members M and N).

Alternatively, the proper joining of the fastener members may be secured by the appropriate formation of the runner $R^1$ in the manner shown in Figs. 12 to 14. It may be seen from these figures that the outlets U, V of the runner $R^1$ are arranged at different levels and that the slots G and H of the channels are curved as shown.

With the fastener according to Fig. 11 the following advantages over that according to Figs. 8 to 10 are achieved:

(1) Closing of the fastener can be effected even if the fastener is subjected to extremely heavy pull or tension during the closing operation;

(2) The pliability and flexibility of the fastener are considerably increased;

(3) Bending of the fastener can be carried to extremely small radii of curvature, without interference with the operability of the fastener and with the locking effect obtained;

(4) Liability to torsional warping and similar distortions of the fastener are practically eliminated;

(5) Closing of the fastener is rendered easier than with any other fastener as it does not require the bending apart by a wide angle, of the fastener members at the point of their union (within the runner).

Therefore the fastener according to Fig. 11 is also applicable to technical purposes for which sliding clasp fasteners have so far not been usable.

The effects as stated above are due to the capability of the floating coils $x$ and $z$ of the members M and N (Fig. 11) to freely adjust themselves to varying conditions in both transverse and longitudinal directions.

Similar effects are obtained with fastener members embodying more than one floating coils, and also if one of the fastener members only embodies a floating coil as described with reference to Fig. 11, whereas the other member is of the kind described with reference to Figs. 8 to 10.

In the manufacture of composite members according to the invention wire of any cross-section, such as circular, elliptical, oval, triangular, square or other, or wires of different cross-section may be used.

Also wire having a coarse or uneven superficiality may be used, in accordance with the invention. It should be understood, however, that the invention from both a technical and an economical viewpoint provides the greatest advantage, if all coils are made of smooth wire of circular or oval section.

Also it should be understood that a fastener member is to be considered as "composite member" according to the above definition, irrespective of whether such member is constituted by separate coiled elements or by a single coiled wire returned on itself.

I desire it further to be understood that the invention is not limited to fasteners made of coils having circular cross-section since also flattened coils (having elliptical or similar coil cross-section) or coils of any other formation, if arranged as described, would operate similar to the manner hereinbefore described.

As described the joining of the fastener elements to a material such as stringer tape may be effected by means of a thread stitched or looped in any suitable manner. Alternatively the joining may also be effected by several threads, by the transverse threads of portions of ladder-like texture formed in the tape or other material, or by weaving.

Wherever in this specification a fastener member is said to comprise a left-hand wound coil or coils same may be substituted by a right-hand wound coils or coils, provided that in the second fastener member the right-hand wound coil or coils are substituted by a left-hand wound coil or coils.

The word "wire" used in this specification should not be used in the narrow meaning of the word, i. e. as a reference to metal wire only, considering that in modern art articles functionally equivalent to metal wire may also be made of non-metallic substances, for instance of synthetic or plastic materials.

I claim:

1. In a fastener of the character described, a pair of fastener members attachable to parts to be joined, each of which members comprises a series of convolutions, at least one of the said members being a composite member the convolutions of which are formed each of a group of similar interlinked elements, each fastener member having its successive convolutions spaced from one another so as to form a series of interspaces normally narrower than the thickness of one convolution of the companion member.

2. In a fastener of the character described, a pair of fastener members attachable to parts to be joined, each of which members comprises a series of convolutions, at least one of the said members being a composite member constituted by a plurality of interlinked coils of substantially equal pitch which have their corresponding windings juxtaposed to form groups, the companion member comprising a series of convolutions spaced from each other so as to form a series of interspaces normally narrower than the combined thickness of the grouped coil windings constituting each operative convolution of such composite member.

3. In a fastener of the character described, a pair of fastener members attachable to parts to be joined, and means displaceable on the said members for moving the convolutions of the two fastener members to and from intermeshing relation, at least one of the said members being a composite member constituted by a plurality of interlinked coils of substantially equal pitch, which have their corresponding windings juxtaposed to form groups, the companion member comprising a series of convolutions spaced from each other so as to form a series of interspaces normally narrower than the combined thickness of the grouped coil windings constituting each operative convolution of such composite member.

4. In a fastener of the character described, a pair of fastener members each of which comprises a series of convolutions, at least one of the said fastener members being a composite member the convolutions of which are each formed of a group of similar interlinked elements movable relative to each other transversely to the longitudinal axis of such member, each fastener member having its successive convolutions spaced from each other so as to form effective interspaces normally narrower than the thickness of a convolution of the respective companion member.

5. In a fastener of the character described, a pair of coiled fastener members attachable to parts to be joined, and means slidably displaceable on the said members for moving the convolutions of the two fastener members to and from intermeshing relation, at least one of the said fastener members being a composite member the convolutions of which are each formed of a group of similar interlinked elements movable relative to each other transversely to the longitudinal axis of such member, each fastener member having its successive convolutions spaced from each other so as to form effective interspaces normally narrower than the thickness of a convolution of the respective companion member.

6. In a fastener of the character described, a pair of coiled oppositely wound fastener members attachable to parts to be joined, and a runner which is slidable on the said fastener members and is adapted to effect the opening and closing of the fastener, at least one of the two fastener members being a composite member constituted by a plurality of interlinked coils which are wound in the same winding sense and have their corresponding windings juxtaposed to form groups, the companion member to such composite member having its effective interspaces normally narrower than the combined thickness of the grouped windings constituting the operative convolutions of such composite member, the fastener further comprising means which loosely join the windings of such composite member to each other in such a manner as to allow only for a limited relative displacement of its coils in a direction substantially transverse to the axes of the said coils.

7. In a fastener of the character described, a pair of coiled oppositely wound fastener members attached to parts to be joined, and a runner which is slidable on the said fastener members and is adapted to effect the opening and closing of the fastener, at least one of the two fastener members being a composite member constituted by a plurality of interlinked coils which are wound in the same winding sense and have their corresponding windings juxtaposed to form groups, the companion member to such composite member having its effective interspaces normally narrower than the combined thickness of the grouped windings constituting the operative convolutions of such composite member, the fastener further comprising means which loosely join the windings of such composite member to each other in such a manner as to allow only for a limited relative displacement of its coils in a direction substantially transverse to the axes of the said coils, the said means also constituting the medium for securing such composite fastener member to the part to which it is attached.

8. In a fastener of the character described, two elongated coiled fastener members wound in opposite directions, and a runner slidable thereon and adapted to effect the opening and closing of the fastener, one of the said fastener members consisting of a single coil only whereas the other member is a composite member constituted by a plurality of coils of substantially equal pitch which are wound in the same direction and are movable relative to each other transversely to the axes of their constituent coils, the said single-coil member having its convolutions spaced so as to form a series of interspaces normally narrower than the combined thickness of the grouped windings constituting each operative convolution of the said composite member.

9. In a fastener of the character described, two elongated coiled fastener members wound in opposite directions, and a runner slidable thereon and adapted to effect the opening and closing of the fastener, one of the said fastener members consisting of a single coil only whereas the other member is a composite member constituted by two coils of substantially equal pitch which are wound in the same direction and are movable relative to one another transversely to the axes of their constituent coils, the said single-coil member having its convolutions spaced so as to form a series of interspaces normally narrower than the combined thickness of the grouped windings constituting each operative convolution of the said composite member.

10. In a fastener according to claim 9, the provision of means which loosely join the grouped windings of the composite member so as to allow only for a limited relative displacement of its constituent coils in a direction substantially transverse to the axes of the said coils.

11. In a fastener according to claim 9, the provision of means which loosely join the grouped windings of the said composite member so as to allow only for a limited relative displacement of its constituent coils in a direction substantially transverse to the axes of the said coils, the said means also constituting the medium for securing the composite fastener member to the parts to which it is attached.

12. In a fastener according to claim 9, the provision of means for securing only one of the coils of the composite member to the part to which the said composite member is attached, whereas the second coil of the composite member is retained within, but not secured to, the said firstmentioned coil, thus allowing for a limited floating movement of the said second coil within the said firstmentioned coil.

13. In a fastener of the character described, two elongated coiled fastener members wound in opposite directions, and a runner which is slidable thereon and is adapted to effect the opening and closing of the fastener, both fastener members being composite members, each member being constituted by a plurality of coils of substantially equal pitch which are wound in the same direction, have their corresponding windings juxtaposed to form groups and are movable relative to each other transversely to the axes of the respective constituent coils, and each member having its operative convolutions spaced so as to form a series of interspaces normally narrower than the combined thickness of the grouped windings constituting each operative convolution of the companion member.

14. In a fastener of the character described, two elongated coiled fastener members wound in opposite directions, and a runner which is slidable thereon and is adapted to effect the opening and closing of the fastener, both fastener members being composite members each constituted by two coils of substantially equal pitch which are wound in the same direction, have their corresponding windings juxtaposed to form groups, and are movable relative to one another in directions substantially transverse to their respective axes, each member having its operative convolutions spaced so as to form a series of interspaces normally narrower than the combined thickness of the grouped windings constituting each operative convolution of the companion member.

15. In a fastener according to claim 14, the provision of means which loosely join the grouped windings of each composite member so as to allow only for a limited relative displacement of its constituent coils in a direction substantially transverse to the axes of the said coils.

16. In a fastener according to claim 14, the provision of means which loosely join the grouped windings of each composite member so as to allow only for a limited relative displacement of its constituent coils in a direction substantially transverse to the axes of the said coils, the said means also constituting the medium for securing the members to the respective parts to which they are attached.

17. In a fastener according to claim 14, the provision of means for securing only one of the constituent coils of each member to the part to which the respective member is attached, whereas the second coil of each member is retained within, but not secured to, the first mentioned coil, thus allowing for a limited floating movement of each non-secured coil within the coil in which it is retained, further provisions being made to assure that in the closed fastener the windings of each "floating" coil shall engage windings of the two "secured" coils only, but not the windings of the other "floating" coil.

18. A fastener of the character described, comprising two elongated, oppositely wound coiled fastener members, and a runner slidable thereon and adapted to effect both the opening and closing of the fastener, wherein both fastener members are composite members each constituted by two coils which are wound in the same winding sense and have their corresponding windings juxtaposed to form groups and a series of interspaces normally narrower than the combined thickness of the grouped windings forming an operative convolution of the companion member, one of the composite members comprising means which loosely join the grouped windings of the said member and also act as a medium for securing the said member to the part to which it is attached, whereas the second composite member has only one of its constituent coils secured to the part to which the said member is attached, the other coil of said second member being retained within, but not secured to, the said first-mentioned coil.

RICHARD GOLDNER.